United States Patent
Yamamoto et al.

(10) Patent No.: US 9,551,824 B2
(45) Date of Patent: Jan. 24, 2017

(54) LIGHT GUIDE PLATE, METHOD FOR PRODUCING LIGHT GUIDE PLATE, SURFACE LIGHT SOURCE DEVICE, AND LIQUID CRYSTAL DISPLAY DEVICE

(75) Inventors: Hiroshi Yamamoto, Kawaguchi (JP); Hiroshi Sekiguchi, Tokyo (JP); Masahiro Goto, Kashiwa (JP); Keiji Kashima, Tokorozawa (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 614 days.

(21) Appl. No.: 13/387,863

(22) PCT Filed: Jul. 29, 2010

(86) PCT No.: PCT/JP2010/062754
§ 371 (c)(1),
(2), (4) Date: Jan. 30, 2012

(87) PCT Pub. No.: WO2011/013733
PCT Pub. Date: Feb. 3, 2011

(65) Prior Publication Data
US 2012/0127397 A1 May 24, 2012

(30) Foreign Application Priority Data
Jul. 31, 2009 (JP) .................. 2009-179835

(51) Int. Cl.
*G02F 1/1335* (2006.01)
*F21V 8/00* (2006.01)

(52) U.S. Cl.
CPC .......... *G02B 6/0065* (2013.01); *G02B 6/0038* (2013.01); *G02B 6/0041* (2013.01); *G02F 2001/133607* (2013.01); *Y10T 29/49826* (2015.01)

(58) Field of Classification Search
None
See application file for complete search history.

(56) References Cited

U.S. PATENT DOCUMENTS 6,692,133 B2 * 2/2004 Katsu et al. .................. 349/64
7,278,775 B2 * 10/2007 Yeo et al. .................. 362/627
(Continued)

FOREIGN PATENT DOCUMENTS

JP 07-120605 5/1995
JP 09-145931 6/1997
(Continued)

OTHER PUBLICATIONS

Korean Office Action (Application No. 10-2012-7002343) dated Jul. 25, 2013 (with English translation).
(Continued)

*Primary Examiner* — Ryan Crockett
(74) *Attorney, Agent, or Firm* — Burr & Brown, PLLC

(57) ABSTRACT

A light guide plate has a light exit surface, a back surface opposed to the light exit surface, and a light entrance surface consisting of at least part of a side surface. The light guide plate also has a body portion, and a light exit-side layer formed from an ionizing radiation curable resin. The light exit-side layer includes an optical element portion which defines the light exit surface. The optical element portion includes unit shaped elements arranged in one direction intersecting a light guide direction, each unit shaped element extending linearly in a direction intersecting the one direction.

9 Claims, 9 Drawing Sheets

(56) References Cited

U.S. PATENT DOCUMENTS

| | | | |
|---|---|---|---|
| 2002/0015300 A1* | 2/2002 | Katsu et al. | 362/31 |
| 2006/0056166 A1 | 3/2006 | Yeo et al. | |
| 2008/0130316 A1* | 6/2008 | Kinoshita | G02B 6/0038 362/620 |
| 2008/0232135 A1* | 9/2008 | Kinder et al. | 362/615 |
| 2009/0213576 A1* | 8/2009 | Chang et al. | 362/97.3 |
| 2011/0013868 A1* | 1/2011 | Suzumura | G02B 6/0001 385/32 |
| 2015/0346426 A1* | 12/2015 | Chen | G02B 6/002 362/606 |

FOREIGN PATENT DOCUMENTS

| | | |
|---|---|---|
| JP | 10-253960 | 9/1998 |
| JP | 2002-050219 A1 | 2/2002 |
| JP | 2007-122971 | 5/2007 |
| JP | 2007-227405 | 9/2007 |
| JP | 2008-296587 | 12/2008 |
| JP | 2009-048939 | 3/2009 |

OTHER PUBLICATIONS

Chinese Office Action (with English Translation), Chinese Patent Application No. 201080034978.X, dated Aug. 19, 2013 (23 pages).

* cited by examiner

LIGHT GUIDE PLATE, METHOD FOR PRODUCING LIGHT GUIDE PLATE, SURFACE LIGHT SOURCE DEVICE, AND LIQUID CRYSTAL DISPLAY DEVICE

BACKGROUND OF THE INVENTION

1. Field of the Invention

The present invention relates to a light guide plate having a light exit surface, a back surface opposed to the light exit surface, and a light entrance surface consisting of at least part of side surface extending between the light exit surface and the back surface, and more particularly to a light guide plate having excellent optical properties. The present invention also relates to a method for producing a light guide plate having excellent optical properties, and to a surface light source device and a display device, both having a light guide plate having excellent optical properties.

2. Description of Related Art

A surface light source device for illuminating a liquid crystal display panel from the back is in widespread use (see e.g. JP 2007-227405A, JP 2008-296587A and JP 9-145931A). Surface light source devices are roughly classified into direct-light type devices which have a light source disposed right behind an optical member, and edge-light type devices which have a light source disposed lateral to an optical member. Edge-light type surface light source devices have the advantage that the surface light source devices can be made thin as compared to direct-light type surface light source devices.

In an edge-light type surface light source device, a light guide plate is provided lateral to a light source, and light from the light source enters the light guide plate from the side surface (light entrance surface) of the light guide plate. The light that has entered the light guide plate repeats reflection at a pair of opposing main surfaces and travels in the light guide plate in a direction (light guide direction) almost perpendicular to the light entrance surface. The light traveling in the light guide plate, by the optical action of the light guide plate, is caused to gradually exit the light exit surface as it travels in the light guide plate. The amount of light, exiting the light exit surface of the light guide plate, can thus be equalized. In an exemplary light guide plate, a light scattering component is dispersed in the light guide plate so that light, traveling in the light guide plate, is allowed to gradually exit the light guide plate.

In addition to the equalization of the in-plane distribution of the amount of exiting light, a surface light source device is also required to increase the front-direction luminance, the efficiency of the use of source light, etc. A common surface light source device (see e.g. JP 2007-227405A), therefore, has various optical members, such as an optical sheet (prism sheet) for adjusting the angular distribution of luminance for a light component traveling along the light guide direction, an optical sheet (prism sheet) for adjusting the angular distribution of luminance for a light component traveling along a direction perpendicular to the light guide direction, etc., disposed on the side of the light exit surface of a light guide plate. It is very desirable if excellent optical properties can be imparted to a light guide plate and therefore the number of optical members in a surface light source device can be reduced. This makes it possible to reduce the production cost of the surface light source device, facilitate the assembly of the surface light source device and make the surface light source device thinner.

On the other hand, a conventional light guide plate is produced by injection molding or thermal transfer processing as disclosed in JP 2007-227405A, JP 2008-296587A and JP 9-145931A. As display devices are becoming thinner with larger screens these days, it is becoming difficult to produce a light guide plate by a conventional method even with such accuracy as to allow the light guide plate to fully perform its intended function. Thus, it is practically impossible to impart additional optical properties to a light guide plate produced by a conventional production method.

SUMMARY OF THE INVENTION

The present invention has been made in view of the above situation. It is therefore an object of the present invention to provide a light guide plate having excellent optical properties and to provide a surface light source device and a display device, both having the light guide plate. It is also an object of the present invention to provide a method for producing a light guide plate having excellent optical properties.

The present invention provides a light guide plate comprising
  a light exit surface;
  a back surface opposed to the light exit surface; and
  a light entrance surface consisting of at least part of a side surface between the light exit surface and the back surface,
  said light guide plate comprising:
  a body portion; and
  a light exit-side layer disposed on a side of the light exit surface side relative to the body portion and formed by curing of an ionizing radiation curable resin,
  wherein the light exit-side layer includes an optical element portion which defines the light exit surface and which has a plurality of unit shaped elements arranged in one direction, the one direction intersecting a direction connecting the light entrance surface and a surface which consists of another part of the side surface and which is opposed to the light entrance surface, each unit shaped element extending linearly in a direction intersecting the one direction.

The optical element portion of the light guide plate can effectively exert an optical effect on a light component traveling along a direction intersecting a direction connecting the light entrance surface and the surface which consists of another part of the side surface and which is opposed to the light entrance surface. Because the light exit-side layer, including the optical element portion, is formed by curing of an ionizing radiation curable resin, excellent optical properties can be imparted to the optical element portion.

In a preferred embodiment of the light guide plate according to the present invention, a ratio (L/T) of a length L of the light guide plate, from the light entrance surface to the surface consisting of another part of the side surface and opposed to the light entrance surface, relative to an average thickness T of the light guide plate along a normal direction of a plate plane of the light guide plate, is not more than 500, and a ratio (t2/t1) of an average thickness t2 of the light exit-side layer along the normal direction of the plate plane of the light guide plate to an average thickness t1 of the body portion along the normal direction of the plate plane of the light guide plate, is not more than 0.1. Such a light guide plate can effectively prevent discoloration of light, exiting the light exit surface, due to the light exit-side layer.

In a preferred embodiment of the light guide plate according to the present invention, the unit shaped elements each have a triangular shape in a cross-section along the arrangement direction thereof. Such a light guide plate can exert an excellent light condensing effect (light collecting effect) on a light component traveling along a direction intersecting a direction connecting the light entrance surface and the surface which consists of another part of the side surface and which is opposed to the light entrance surface.

In a preferred embodiment of the light guide plate according to the present invention, the light exit-side layer is composed of a single resin material. The light exit surface of such a light guide plate can perform an expected optical action with high efficiency.

In a preferred embodiment of the light guide plate according to the present invention, the body portion has a resin and a light scattering component dispersed in the resin.

In a preferred embodiment of the light guide plate according to the present invention, the body portion is a plate-like member formed by extrusion molding. Such a light guide plate can be formed with good accuracy even when the light guide plate is flat and thin, having a high ratio of the length L of the light guide plate to the average thickness T of the light guide plate.

In another aspect of the present invention, a surface light source device is provided, comprising: any one of the above-described light guide plates according to the present invention; and a light source disposed so as to face the light entrance surface of the light guide plate. According to the surface light source device, the optical element portion of the light guide plate can effectively exert an optical effect on a light component traveling along a direction intersecting a direction connecting the light entrance surface and the surface which consists of another part of the side surface and which is opposed to the light entrance surface. Because the light exit-side layer, including the optical element portion, is formed by curing of an ionizing radiation curable resin, excellent optical properties can be imparted to the optical element portion.

In a preferred embodiment of the present invention, the surface light source device further comprises a reflective sheet disposed so as to face the back surface of the light guide plate, and an optical sheet disposed so as to face the light exit surface of the light guide plate, the optical sheet having unit prisms.

In yet another aspect, a display device is provided, comprising: any one of the above-described surface light source devices according to the present invention; and a liquid crystal panel disposed so as to face the surface light source device. According to the display device, the optical element portion of the light guide plate can effectively exert an optical effect on a light component traveling along a direction intersecting a direction connecting the light entrance surface and the surface which consists of another part of the side surface and which is opposed to the light entrance surface. Because the light exit-side layer, including the optical element portion, is formed by curing of an ionizing radiation curable resin, excellent optical properties can be imparted to the optical element portion.

In a preferred embodiment of the present invention, the surface light source device further comprises a controller configured to control the output of the light source; the light source includes a plurality of point-like light emitters arranged so as to face the light entrance surface of the light guide plate; and the controller adjusts the output of each point-like light emitter according to an image to be displayed.

In yet another aspect, a method is provided for producing a light guide plate having a light exit surface, a back surface opposed to the light exit surface, and a light entrance surface consisting of at least part of a side surface between the light exit surface and the back surface. The method comprises:

a step of providing a body portion; and a step of forming a light exit-side layer, by curing of an ionizing radiation curable resin, on the body portion, wherein an optical element portion is formed in the forming step, the optical element portion defining the light exit surface and having unit shaped elements arranged in one direction intersecting a direction connecting the light entrance surface and a surface which consists of another part of the side surface and which is opposed to the light entrance surface, each unit shaped element extending linearly in a direction intersecting the one direction.

According to a light guide plate produced by the production method, the optical element portion can effectively exert an optical effect on a light component traveling along a direction intersecting a direction connecting the light entrance surface and the surface which consists of another part of the side surface and which is opposed to the light entrance surface. Thus, excellent optical properties can be imparted to the light guide plate. Because the light exit-side layer, including the optical element portion, is formed by curing of an ionizing radiation curable resin, excellent optical properties can be imparted to the optical element portion.

In a preferred embodiment of the light guide plate production method according to the present invention, the body portion is produced by extrusion molding in the step of preparing the body portion. According to such a light guide plate production method, even a flat and thin light guide plate, having a high ratio of the length L to the average thickness T, can be formed with good accuracy.

In the present invention, the light-exit side layer of a light guide plate includes the optical element portion which defines the light exit surface. The optical element portion comprises unit shaped elements arranged in one direction intersecting a direction connecting the light entrance surface and the surface which consists of another part of the side surface and which is opposed to the light entrance surface. Each unit shaped element extends linearly in a direction intersecting the one direction. Therefore, according to the present invention, the light guide plate can effectively exert an optical effect on a light component traveling along a direction intersecting a direction connecting the light entrance surface and
the surface which consists of another part of the side surface and which is opposed to the light entrance surface. Particularly according to the present invention, the light exit-side layer, including the optical element portion, is formed by curing of an ionizing radiation curable resin. Excellent optical properties can therefore be imparted to the optical element portion.

DESCRIPTION OF THE INVENTION

Figure 1:
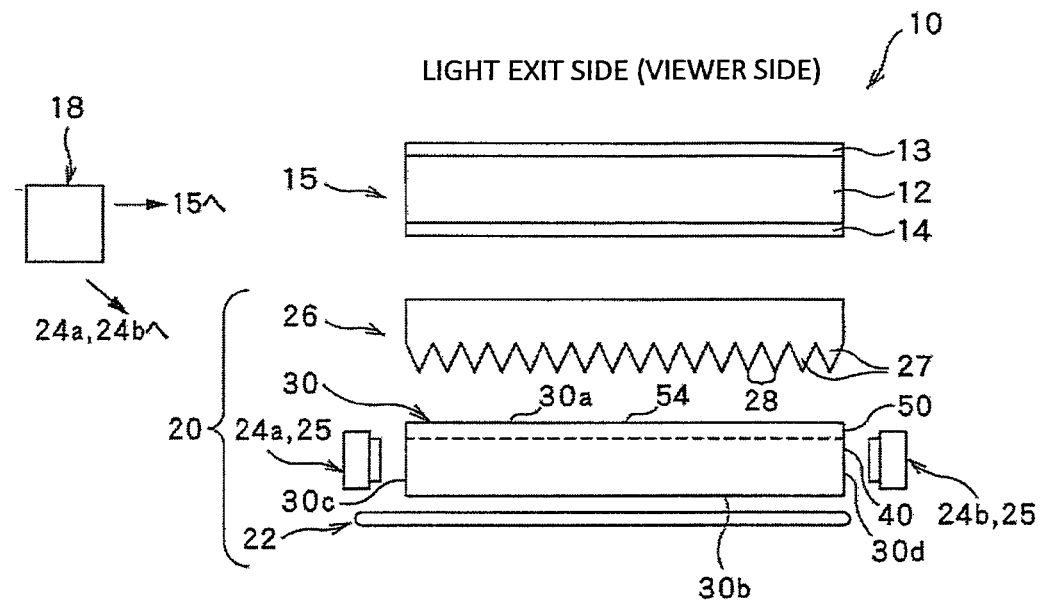
FIG. 1 is a diagram illustrating one embodiment of the present invention, being a cross-sectional view showing the schematic construction of a display device and a surface light source device.

Preferred embodiments of the present invention will now be described with reference to the drawings. FIGS. 1 through 5 are drawings illustrating an embodiment of the present invention. In the drawings attached to the present specification, for the sake of illustration and easier understanding, scales, horizontal to vertical dimensional ratios, etc. are exaggeratingly modified from those of the real things.

As shown in FIG. 1, the display device 10 includes a liquid crystal display panel 15, a surface light source device 20, disposed at the rear of the liquid crystal display panel 15, for illuminating the liquid crystal display panel 15 from the back, and a controller 18 for controlling the liquid crystal display panel 15 and the surface light source device 20.

The illustrated liquid crystal display panel 15 includes an upper polarizing plate 13 disposed on the light exit side, a lower polarizing plate 14 disposed on the light entrance side, and a liquid crystal cell 12 disposed between the upper polarizing plate 13 and the lower polarizing plate 14. The liquid crystal cell 12 is a member including a pair of support plates, e.g. made of glass, a liquid crystal disposed between the support plates, and an electrode for controlling the orientation of liquid crystal molecules by an electric field for each pixel region. The liquid crystal between the support plates is capable of changing its orientation for each pixel region. The liquid crystal display panel 15 thus functions as a shutter for controlling transmission and blocking of light from the surface light source device 20 for each pixel so as to form an image. The details of the liquid crystal display panel 15 are known from various documents (see e.g. "Dictionary of Flat Panel Display", edited by T. Uchida and H. Uchiike, 2001, Kogyo Chosakai Publishing Co., Ltd.), and hence a further detailed description thereof will be omitted.

The surface light source device 20 will now be described. As shown in FIG. 1, the surface light source device 20 is configured as an edge-light type surface light source device, and includes a light guide plate 30 and light sources 24a, 24b disposed lateral to the light guide plate 30. The light guide plate 30 is configured as a quadrangular plate-like member having a pair of main surfaces. The light guide plate 30 has a light exit surface 30a which is the main surface on the side of the liquid crystal display panel 15, a back surface 30b which is the other main surface that opposes the light exit surface 30a, and four flat side surfaces as a side surface extending between the light exit surface 30a and the back surface 30b. Part of the side surfaces of the light guide plate 30 constitutes at least one light entrance surface, and the light source 24a is disposed so as to face the light entrance surface. Another part of the side surfaces constitutes a counter surface 30d that opposes the one light entrance surface 30c. Light that has entered the light guide plate 30 from the one light entrance surface 30c is guided in the light guide plate 30 generally along a direction connecting the one light entrance surface 30c and the counter surface 30d that opposes the one light entrance surface 30c (herein also referred to as light guide direction which, in this embodiment, corresponds to a direction perpendicular to the light entrance surfaces 30c, 30d). The surface light source device 20 further includes a reflective sheet 22 disposed so as to face the back surface 30b of the light guide plate 30, and an optical sheet 26 disposed so as to face the light exit surface 30a of the light guide plate 30.

In this embodiment, of the side surfaces, the two side surfaces that oppose each other in the light guide direction are the light entrance surfaces 30c, 30d, as shown in FIG. 1. The one light entrance surface 30c serves as a first light entrance surface and the counter surface 30d, opposing the first light entrance surface 30c, serves as a second light entrance surface. As shown in FIG. 1, a first light source 24a is disposed opposite the first light entrance surface 30c, and a second light source 24b is disposed opposite the second light entrance surface 30d. The light guide plate 30 of this embodiment has a constant cross-sectional shape at varying positions along the light guide direction.

Figure 2:
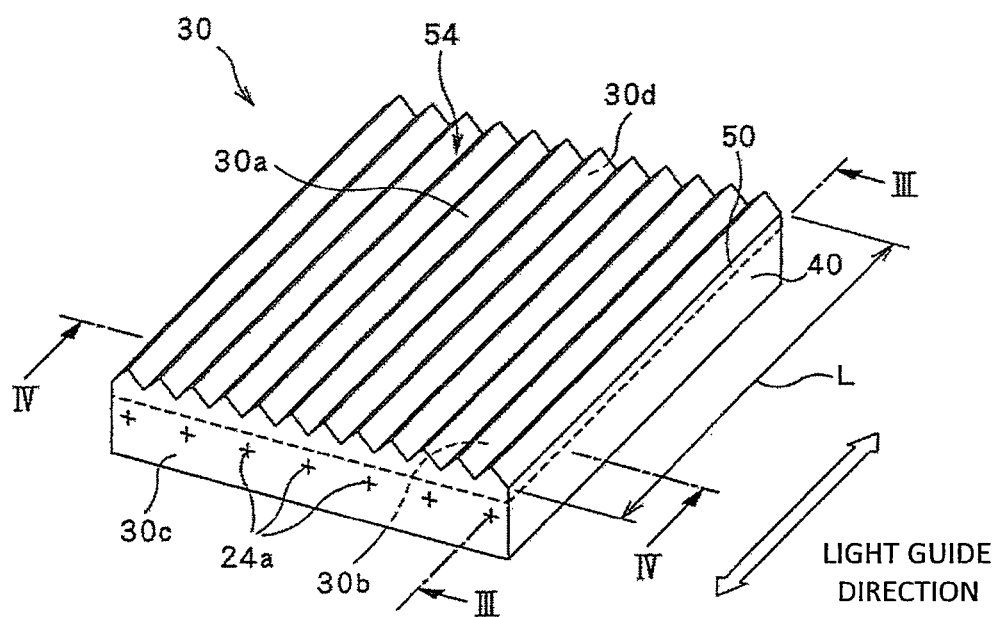
FIG. 2 is a perspective view of a light guide plate incorporated into the surface light source device of FIG. 1.

Various types of light emitters, including a fluorescent tube as a linear cold-cathode fluorescent lamp, point-like LEDs (light emitting diodes), an incandescent bulb, etc., can be used for the light sources 24a, 24b. In this embodiment the light sources 24a, 24b are each comprised of a large number of point-like light emitters (e.g. LEDs) 25, arranged side by side in a direction parallel to both the light entrance surfaces 30c, 30d and the plate plane of the light guide plate 30. FIG. 2 shows the arrangement positions of the point-like light emitters 25 constituting the light sources 24a, 24b. The controller 18 can control the output of an individual point-like light emitter 25, i.e. turn-on and turn-off of an individual point-like light emitter 25 and/or the luminance of the light emitter 25, independent of the other point-like light emitters.

The reflective sheet 22 is a member which reflects light that has exited the back surface of the light guide plate 30 so that the light will re-enter the light guide plate 30. The reflective sheet 22 may be comprised of a white scattering reflection sheet, a sheet composed of a material having a high reflectance, such as a metal, a sheet having a film layer of a high-reflectance material (e.g. a metal film), or the like.

The optical sheet 26 is a sheet-like member for changing the travel direction of light that has entered the light entrance side of the optical sheet 26 and causing the light to exit the light exit side in such a manner as to intensively increase the front-direction luminance. In the embodiment illustrated in FIGS. 1 and 3, the optical sheet 26 has a plurality of unit prisms 27 arranged side by side on the sheet plane of the optical sheet 26 in a certain direction (arrangement direction), in particular in the light guide direction of the light guide plate 30. The unit prisms 27 each extend on the sheet plane of the optical sheet in a straight line in a direction perpendicular to the arrangement direction. Each unit prism 27 has a triangular shape in a cross-section perpendicular to the longitudinal direction. The top (apex) 28 of the triangular cross-section of each unit prism 27 projects toward the light guide plate 30.

The terms "sheet", "film" and "plate" are not used herein to strictly distinguish them from one another. Thus, the term "sheet" includes a member which can also be called a film or plate.

The term "plate plane (sheet plane, film plane)" herein refers to a plane which coincides with the planar direction of an objective sheet-like member when taking a perspective and overall view of the sheet-like member. In this embodiment the plate plane of the light guide plate 30, the sheet plane of the optical sheet 26, the sheet plane of the reflective sheet 22, the panel plane of the liquid crystal display panel, the display surface of the display device 10 and the light emitting surface of the surface light source device 20 are parallel to each other. The term "front direction" herein refers to the normal direction and (see FIGS. 3 and 4) of the plate plane of a light guide plate, and coincides with the normal direction of the light emitting surface of the surface light source device 20, etc.

The terms "unit shaped element", "unit optical element", "unit prism" and "unit lens" herein refer to an element which functions to exert an optical action, such as refraction or reflection, on light and change the travel direction of the light, and are not used herein to strictly distinguish them from one another.

The light guide plate 30 will now be described in greater detail mainly with reference to FIGS. 2 through 4. As well shown in FIGS. 3 and 4, the light guide plate 30 comprises a body portion 40 containing a light scattering component (light scattering particles) 45, and a light exit-side layer 50 disposed on the light exit side of the body portion 40. The body portion 40 defines the back surface 30b of the light guide plate 30, and the light exit-side layer 50 defines the light exit surface 30a of the light guide plate 30.

Figure 3:
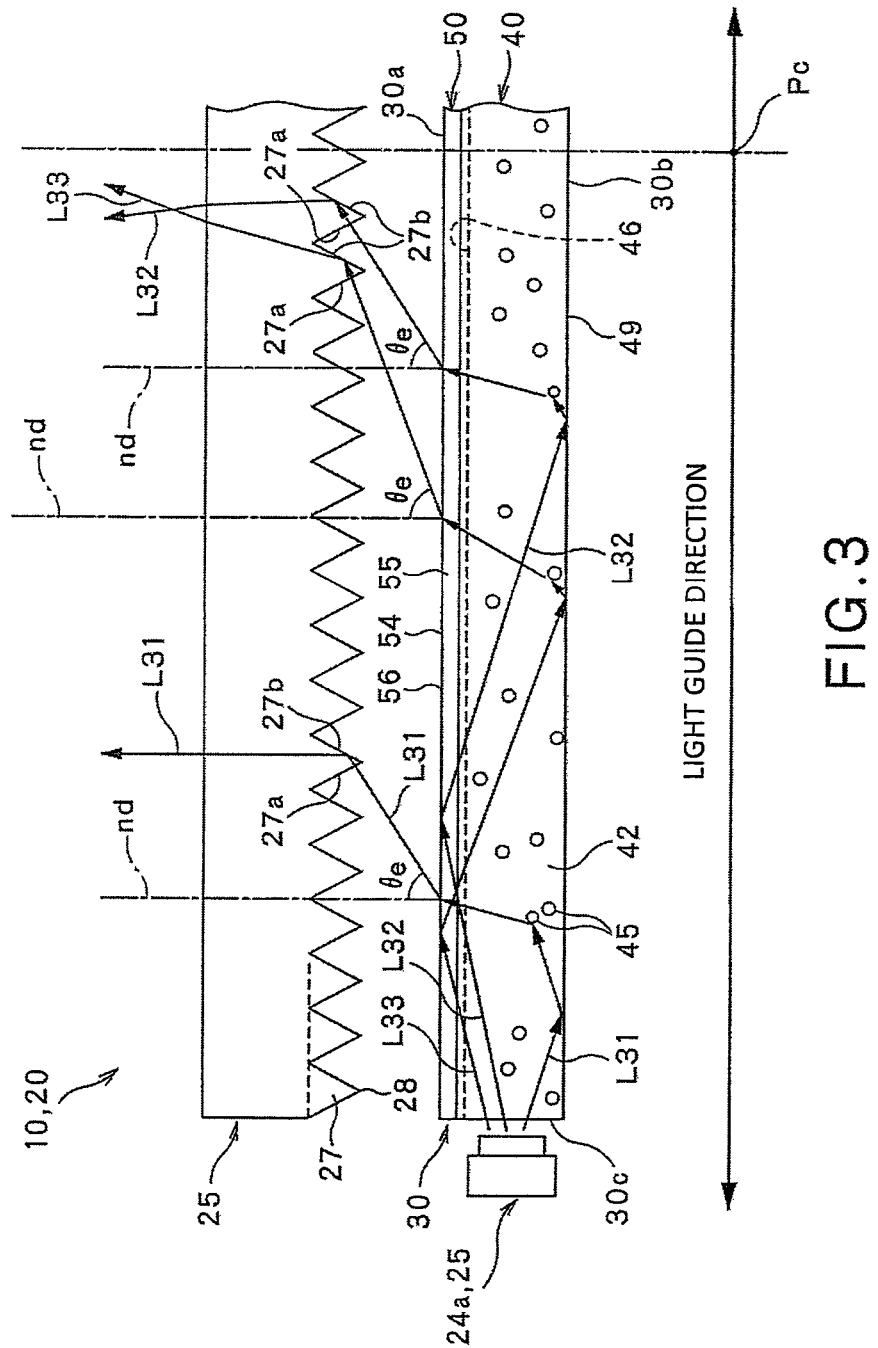
FIG. 3 is a diagram illustrating the action of a surface light source device, showing the light guide plate in the cross-section taken along the line of FIG. 2 together with a light source and an optical sheet.
Figure 4:
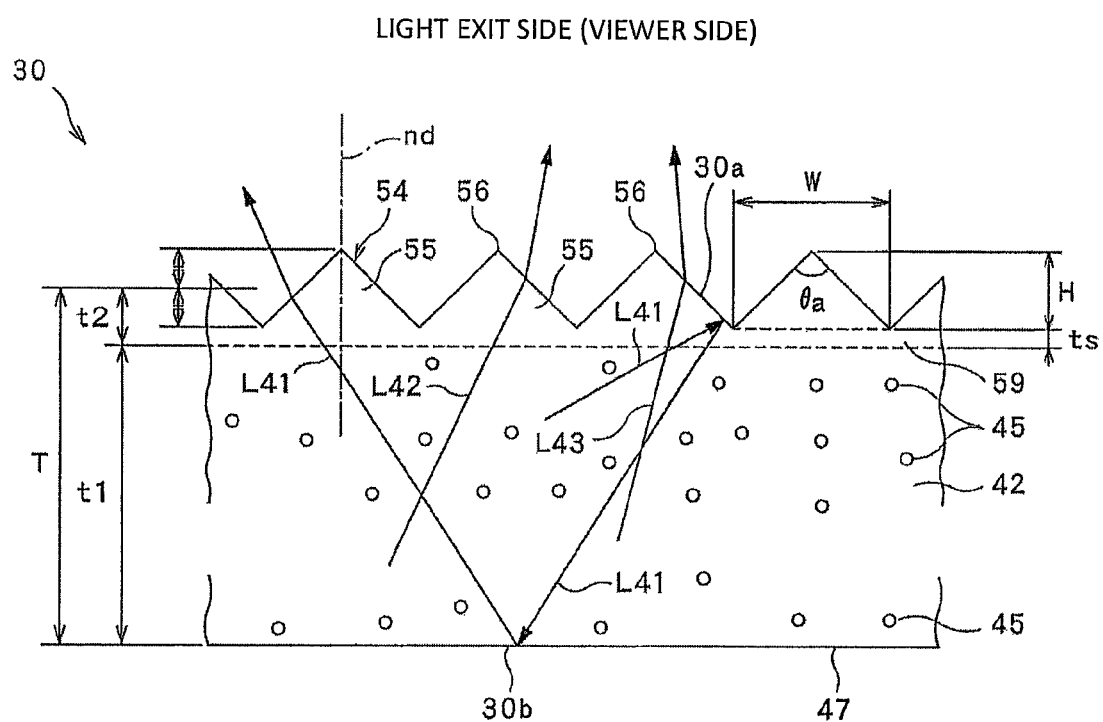
FIG. 4 is a cross-sectional view taken along the line IV-IV of FIG. 2.

As shown in FIGS. 3 and 4, the body portion 40 comprises a matrix 42 and a light scattering component (diffusing component) 45 dispersed in the matrix 42. The light scattering component 45 herein refers to a component which can exert an optical action, such as refraction or reflection, on light traveling in the body portion 40 so as to change the travel direction of the light. Such a light diffusing effect (light scattering effect) of the light scattering component 45 can be produced by using, as the light scattering component 45, a material having a different refractive index from that of the matrix 42, or a material which can exert a reflective effect on light. The light scattering component 45 having a different refractive index from that of the matrix 42 may be exemplified by a metal compound, an organic compound or a gas-containing porous material, or air bubbles. In Figures other than FIGS. 3 and 4, depiction of the light scattering component 45 is omitted.

As well shown in FIG. 3, the body portion 40 is a sheet-like portion having the pair of parallel main surfaces. The body portion 40 has, on the side of the light exit surface 30a, a flat surface (light exit-side surface) 46 parallel to the plate plane of the light guide plate 30 and, on the opposite side, has a flat surface (light entrance-side surface) 49 coinciding with the back surface 30b and parallel to the plate plane of the light guide plate 30.

The light exit-side layer 50 will now be described. As shown in FIGS. 3 and 4, the light exit-side layer 50 is formed on the body portion 40 and comprises a sheet-like support portion (land portion) 59, and an optical element portion 54 provided on the support portion 59 and defining the light exit surface 30a of the light guide plate 30. The light exit-side layer 50 has, on the side of the back surface 30b, a flat surface parallel to the plate plane of the light guide plate 30 and, on the opposite side, has an uneven surface coinciding with the light exit surface 30a and inclined with respect to the plate plane of the light guide plate 30. In this embodiment, unlike the body portion 40, the light exit-side layer 50 is composed of a single resin material and contains no light scattering component.

The optical element portion 54 consists of a plurality of unit shaped elements 55 arranged side by side in an arrangement direction intersecting a direction (light guide direction) connecting the light entrance surface 30c and the side surface (counter surface) 30d that opposes the light entrance surface 30c. Each unit shaped element 55 extends linearly in a direction intersecting the arrangement direction. In this embodiment, as shown in FIGS. 2 and 4, the unit shaped elements 55 are arranged side by side, with no space therebetween, in a direction (arrangement direction) perpendicular to the light guide direction and parallel to the plate plane of the light guide plate 30. Each unit shaped element 55 extends in a straight line in the light guide direction perpendicular to the arrangement direction. Each unit shaped element 55 has a columnar shape, and has the same cross-sectional shape along the longitudinal direction.

The cross-sectional shape of each unit shaped element 55 may be, for example, a triangular shape projecting toward the light exit side, or a shape in which the top apex, projecting toward the light exit side, of the triangular shape is chamfered. In this embodiment, as shown in FIG. 4, the cross-sectional shape of each unit shaped element 55 is a triangular shape projecting toward the light exit side. Thus, each unit shaped element 55 is configured as a triangular unit prism. Particularly in this embodiment, from the viewpoint of intensively increasing the front-direction luminance in the angular distribution of luminance in a plane parallel to the arrangement direction of the unit shaped elements 55, each unit shaped element 55 has an isosceles triangular shape in the cross-section of FIG. 4, and each unit shaped element 55 is disposed such that the isosceles triangular cross-sectional shape is symmetrical with respect to the front direction nd. The top 56 of each unit shaped element 55, projecting toward the light exit side, coincides with the top apex, the intersection of the two equal sides, of the isosceles triangular cross-sectional shape.

The term "triangular shape" herein includes not only a triangular shape in the strict sense but also a generally-triangular shape that may reflect limitations in production technique, a molding error, etc., and a generally-triangular shape from which the same or similar optical function or effect can be expected. For example, the "triangular shape" herein includes a generally-triangular shape in which the top apex is chamfered (e.g. with corner R of not more than about 10 μm) for various purposes.

The thus-constructed light guide plate 30 can be produced in the following manner: First, the body portion 40 containing the light scattering component 45 is prepared. The body portion 40 can be prepared as a plate-like member (extrudate) produced by extrusion molding. In particular, the body portion 40 having such a shape can be produced by dispersing the light scattering component 45 in a thermoplastic resin which is to make the matrix 42, and subjecting the thermoplastic resin containing the light scattering component 45 to extrusion molding. Particles of a transparent material such as silica (silicon dioxide), alumina (aluminum oxide), an acrylic resin, a polycarbonate resin or a silicone resin, having an average particle size of about 0.5 to 100 μm, may be used as the light scattering component 45. An acrylic resin or a polycarbonate resin, for example, may be used as the binder resin.

Next, the light exit-side layer 50, composed of a cured product of an ionizing radiation curable resin, is formed on the body portion 40. Examples of the ionizing radiation curable resin include an ultraviolet (UV) curable resin comprising an acrylate, methacrylate or epoxy monomer or prepolymer, or a mixture thereof, and an electron beam (EB) curable resin.

More specifically, as shown in FIG. 5(a), a mold 60 having a shaping surface 62, corresponding to the shape of the optical element portion 54 to be produced, is first provided with the shaping surface 62 upward. Next, as shown in FIG. 5(b), a metered amount of an ionizing radiation curable resin 64, e.g. an ultraviolet curable resin, is applied to the shaping surface 62 in a continuous or dotted line along one side of the shaping surface 62. Thereafter, as shown in FIG. 5(C), the separately-prepared body portion 40 is positioned and placed on the mold 60 such that the surface 46 of the body portion 40, on which the light exit-side layer 50 is to be formed, faces the shaping surface 62 of the mold 60. While pressing the mold 60 and the body portion 40 against each other by means of a pair of rubber rolls 66, the rubber rolls 66 are rolled in the longitudinal direction of the unit shaped elements 55 to be produced, thereby forming a layer of the ionizing radiation curable resin 64, having an approximately uniform thickness, between the mold 60 and the body portion 40. Thereafter, as shown in FIG. 5(d), the ionizing radiation curable resin 64 is irradiated with ionizing radiation to cure the layer of the ionizing radiation curable resin 64, thereby forming the light exit-side layer 50 from the ionizing radiation curable resin 64. Thereafter, the light exit-side layer 50 formed on the body portion 40 is peeled from the mold 60. The above-described light guide plate 30 can be produced in this manner.

The layer of the ionizing radiation curable resin 64 can be cured by ultraviolet irradiation when the resin 64 is an ultraviolet (UV) curable resin, or cured by electron beam irradiation when the resin is an electron beam (EB) curable resin.

As described above, when the light exit-side layer 50 is formed by curing an ionizing radiation curable resin, it is preferred to produce the support portion (land portion) 59, together with the optical element portion 54 consisting of the unit shaped elements 55, from the ionizing radiation curable resin. This is because if the support portion 59 is not formed, stripes corresponding to the linearly-extending unit shaped elements 55 are likely to be visible when the surface light source device 20, having the light guide plate 30, is incorporated into the display device 10. Further, if the support portion 59 is not formed, the unit shaped elements 55 are likely to peel off the body portion 40 upon demolding of the molded optical element portion 54 or during processing or handling of the light guide plate 30 after demolding.

Figure 5:
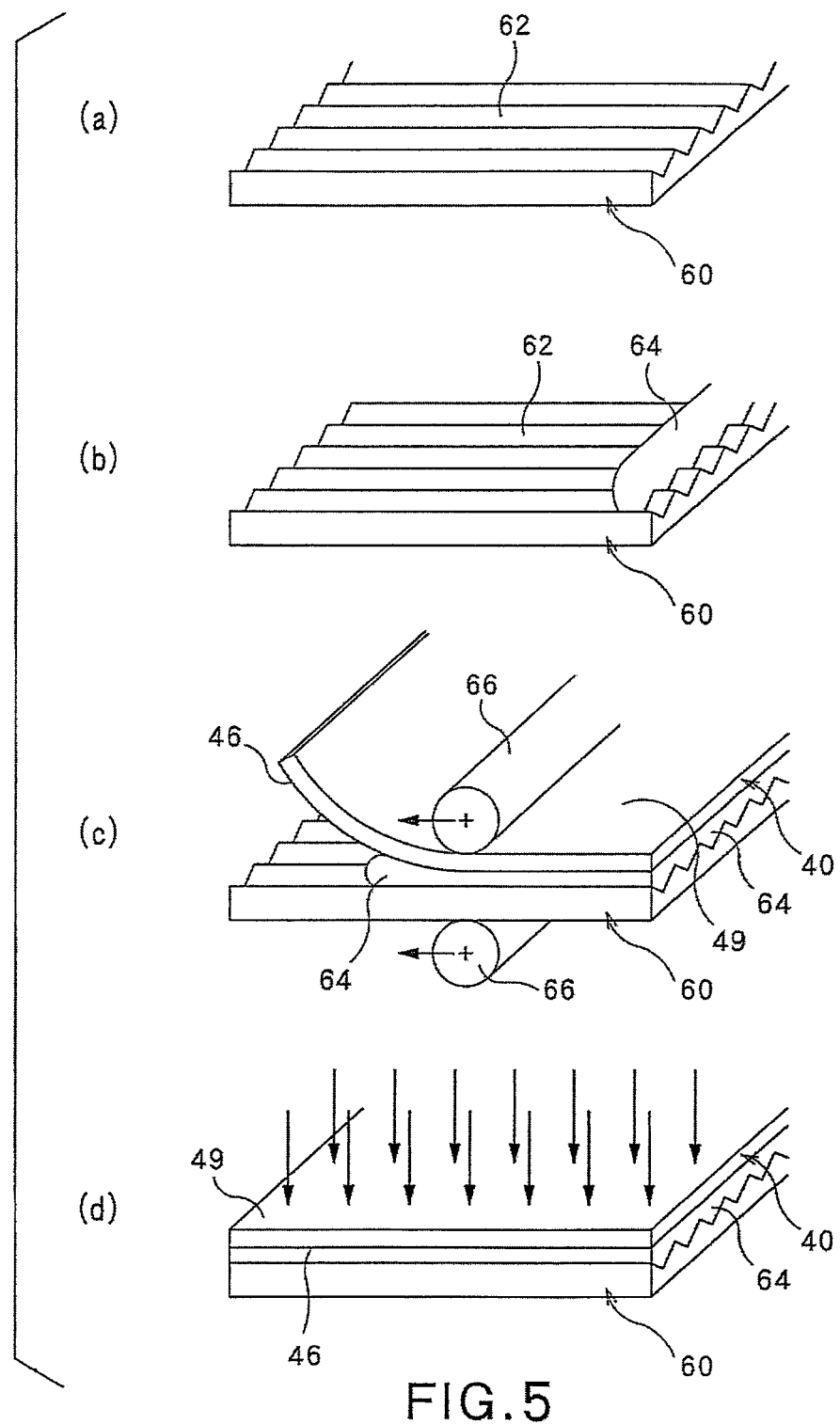
FIGS. 5(a) through 5(d) are diagrams illustrating an exemplary method for forming the light exit-side layer of a light guide plate.

The mold 60 may be configured as a cylindrical roll mold. In the case of a cylindrical roll mold, the peripheral surface serves as a shaping surface 62. A roll mold can produce not only a sheet-like light exit-side layer as shown in FIG. 5 but also a web-like light exit-side layer.

The light guide plate 30 having the above construction may have the following dimensions. The height H (see FIG. 4) of each unit shaped element 55 from the light exit-side surface of the support portion 59 along the normal direction nd of the plate plane of the light guide plate 30 is preferably 10 μm to 50 μm. Therefore, when the cross-sectional shape of each unit shaped element 55 is an isosceles right triangle, the width W (see FIG. 4) at the bottom of each unit shaped element 55 along the arrangement direction of the unit shaped elements 55 is preferably 20 μm to 100 μm. If the unit shaped element 55 is too large, it is likely to be visible. Furthermore, a moire pattern, produced by interference between the arrangement of the pixels of the liquid crystal display panel 15 and the arrangement of the unit shaped elements 55, is likely to be visible. When the cross-sectional shape of each unit shaped element 55 is an isosceles triangle, the apex angle θa (see FIG. 4) at the top apex, the intersection of the two equal sides, is preferably not less than 60° C. and not more than 120° C., more preferably 90° C. from the viewpoint of intensively increasing the front-direction luminance. The thickness is (see FIG. 4) of the support portion 59 along the normal direction nd of the plate plane of the light guide plate 30 is preferably 2 μm to 20 μm, more preferably 5 μm to 10 μm.

The dimensions of the body portion 40, together with the overall dimensions of the light guide plate 30, are preferably determined in the following manner. The ratio (t2/t1) of the average thickness t2 (see FIG. 4) of the light exit-side layer 50 along the normal direction nd of the plate plane of the light guide plate 30 to the average thickness t1 (see FIG. 4) of the body portion 40 along the normal direction nd of the plate plane of the light guide plate 30, is preferably not more than 0.1. Further, the ratio (L/T) of the length L (see FIG. 2) of the light guide plate 30, from the light entrance surface 30c to the side surface (the second light entrance surface in this embodiment) 30d that opposes the light entrance surface 30c, to the average thickness T (see FIG. 4) of the light guide plate 30 along the normal direction nd of the plate plane of the light guide plate 30, is preferably not more than 500. The use of the light guide plate 30 having the above dimensions can effectively prevent discoloration of exiting light due to the light exit-side layer 50, as will be described in detail later.

The term "average thickness" herein refers to the average of measured thicknesses. When a measuring object has a three-dimensional surface configuration defined by equally designed unit shaped elements as in this embodiment, the average of thicknesses measured in several areas of the three-dimensional configuration may be taken as the average thickness. Particularly in the case of unit shaped elements each having a triangular cross-sectional shape, thicknesses at the bottoms of recessed portions and thicknesses at the tops of raised portions may be measured at several points, and the average of measured thicknesses may be taken as the average thickness. Instead of determining an average thickness based on actual measurement, it is also possible to use the following method: The cross-sectional area of an objective portion is calculated (or measured) in a cross-section parallel to the normal direction nd of the plate plane of the light guide plate 30, and the cross-sectional area is divided by the length of the objective portion in the same cross-section and along a direction perpendicular to the normal direction nd. The calculated value is taken as the average thickness.

The operation of the thus-constructed display device 10 will now be described.

As shown in FIG. 3, light emitted by the light sources 24a, 24b enters the light guide plate 30 through the light entrance surfaces 30c, 30d. FIG. 3 illustrates, by way of example, light which comes from the first light source 24a and enters the light guide plate 30 through the first light entrance surface 30c. The following description illustrates the operations of the surface light source device 20 and the display device 10 with reference to the exemplary light shown in FIG. 3. The light guide plate 30 is constructed symmetrically with respect to a center position Pc lying midway between the first light entrance surface 30c and the second light entrance surface 30d in the light guide direction. The first light source 24a and the second light source 24b are constructed symmetrically on opposite sides of the light guide plate 30 in the light guide direction. Likewise, the other components of the surface light source device 20, such as the optical sheet 26 and the reflective sheet 22, and the liquid crystal display panel 15 are symmetrically constructed.

Because of the constructional symmetry, the following description holds true for light which comes from the second light source 24b and enters the light guide plate 30 through the second light entrance surface 30d.

As shown in FIG. 3, lights L31 to L33 that have entered the light guide plate 30 repeat reflection, in particular total reflection at the light exit surface 30a and the back surface 30b due to the difference in refractive index between air and the material of the light guide plate 30, and travels in the light guide direction connecting the light entrance surface 30c and the counter surface 30d of the light guide plate 30.

The body portion 40 of the light guide plate 30 contains the light scattering component 45 dispersed in the matrix. Therefore, as shown in FIG. 3, the travel directions of the lights L31 to L33 traveling in the light guide plate 30 are irregularly changed by the light scattering component 45, and the lights sometimes enter the light exit surface 30a or the back surface 30b at an incident angle which is less than the critical angle for total reflection. Thus, the lights L31 to L33 can exit the light exit surface 30a or the back surface 30b of the light guide plate 30. The lights L31 to L33 that have exited the light exit surface 30a travel toward the optical sheet 26 disposed on the light exit side of the light guide plate 30. On the other hand, light that has exited the back surface 30b is reflected by the reflective sheet 22 disposed behind the light guide plate 30, and re-enters the light guide plate 30 and travels in the light guide plate 30.

Light traveling in the light guide plate 30 can collide with the light scattering component 45, dispersed in the light guide plate 30, at various places in the light guide plate 30 along the light guide direction. Accordingly, light traveling in the light guide plate 30 exits the light exit surface 30a little by little. Thus, the amount of light, exiting the light exit surface 30a of the light guide plate 30, can be made uniform along the light guide direction. The distribution of the amount of light, exiting the light exit surface 30a, in the light guide direction can be controlled by adjusting the particle size, the density, the refractive index, etc. of the light scattering component 45.

The lights L31 to L33 that have exited the light guide plate 30 enter the optical sheet 26. As described above, the optical sheet 26 has the unit prisms 27 each having a triangular cross-sectional shape and projecting toward the light guide plate 30. As well shown in FIG. 3, the longitudinal direction of the unit prisms 27 intersects the light guide direction, and in this embodiment is perpendicular to the light guide direction. On the other hand, due to the difference in refractive index between air and the material of the light guide plate 30, the exit angle of the light guide-direction component of light exiting the light exit surface 30a of the light guide plate 30 (angle θc formed between the light guide-direction component of exiting light and the normal direction nd of the plate plane of the light guide plate 30) tends to fall within a particular angular range (e.g. 65°-85°).

It is therefore possible to design the optical sheet 26 so that light that has exited the light exit surface 30a of the light guide plate 30 mostly passes through one prism surface 27a of a unit prism 27 of the optical sheet 26 and enters the unit prism 27, and thereafter totally reflects at the other prism surface 27b of the unit prism 27, as shown in FIG. 3. In this manner, the optical sheet 26 can change the travel direction of light such that the angle of the travel direction with respect to the front direction becomes smaller. The optical sheet 26 thus has a deflecting effect on transmitted light.

As described hereinabove, the surface light source device 20 can equalize the distribution of the amount of exiting light along the light guide direction and condense exiting light by means of the light guide plate 30, and can also deflect light by means of the optical sheet 26 so as to increase the front-direction luminance.

Light that has exited the surface light source device 20 enters the liquid crystal display panel 15. The liquid crystal display panel 15 transmits light from the surface light source device 20 selectively for each pixel, so that a viewer of the liquid crystal display device 10 can view an image. The overall actions of the liquid crystal display device 10 and the surface light source device 20 are as described above.

In the above-described surface light source device 20, the light condensing effect of the optical sheet 26 is exerted mainly on a light component traveling along the arrangement direction of the unit prisms 27 (light guide direction). The light sources 24a, 24b emit light not parallel to the light guide direction but radially around the light guide direction. Thus, when viewed in the normal direction nd of the plate plane of the light guide plate 30, light traveling in the light guide plate 30 does not solely consist of light traveling in the light guide direction (direction connecting the light entrance surface 30c and the counter surface 30d), but contains a light component traveling in a direction intersecting the light guide direction. The optical sheet 26 cannot effectively exert an optical effect on such light component traveling in a direction intersecting the light guide direction. Thus, it can be expected that such a light component traveling along a direction intersecting the light guide direction is not effectively condensed, and the efficiency of the use of source light is made to be insufficient.

According to this embodiment, on the other hand, the light exit surface 30a of the light guide plate 30 is configured as the optical element portion 54 which consists of the plurality of unit shaped elements 55 arranged side by side in a direction intersecting the light guide direction, in particular in a direction perpendicular to the light guide direction. The optical element portion 54 can effectively exert an optical effect on a light component traveling along a direction intersecting the light guide direction, as shown in FIG. 4.

Specifically, as shown in FIG. 4, lights L41, L42, L43 exiting the light guide plate 30 through the unit shaped elements 55, are refracted at the light exit surface 30a of the light guide plate 30, i.e. the light exit-side surface (prism surface) of the unit shaped elements (unit optical elements, unit prisms) 55. Due to the refraction, the lights L41, L42, L43 each traveling in a direction inclined from the front direction nd, are bent such that the angle of the travel direction (exit direction) of each light with respect to the front direction becomes smaller. Thus, with reference to a light component along a direction perpendicular to the light guide direction, the travel direction of transmitted light can be changed toward the front direction nd. The unit shaped elements 55 thus exert a light condensing effect on a light component traveling along a direction perpendicular to the light guide direction.

The light guide plate 30 of this embodiment thus can not only equalize the amount of light, exiting the light guide plate 30, along the light guide direction but can also exert a light condensing effect on a light component traveling in a direction intersecting the light guide direction.

The light exit surface 30a of the light guide plate 30, i.e. the light exit-side surface (prism surface) of the unit shaped elements (unit optical elements, unit prisms) 55, can also perform the following important optical action on light which is reflected at the surface and guided in the light guide plate 30. As shown in FIG. 4, the light L41 traveling in the light guide plate 30, in most cases when it totally reflects at the light exit-side surface of the unit shaped elements 55, reduces its component along the arrangement direction of the unit shaped elements 55 (direction perpendicular to the light guide direction), and can even turn toward the opposite side (reverse side) of the front direction nd in the main cross-section. In this manner, the light exit-side surface of the unit shaped elements 55 prevents light, emitted radially from a light emitting point, from keeping spreading out in the arrangement direction of the unit shaped elements 55 (direction perpendicular to the light guide direction). Thus, the light exit-side surface of the unit shaped elements 55 enhances the directionality (straightness) of light, traveling in the light guide plate 30, in the light guide direction.

Thus, the movement of light in the arrangement direction of the unit shaped elements 55 is restricted, whereas the movement of light in the longitudinal direction of the unit shaped elements 55 (light guide direction) is promoted. This makes it possible to adjust the distribution of the amount of light, exiting the light exit surface 30a of the light guide plate 30, along the arrangement direction of the unit shaped elements 55 by the construction of the light sources 24a, 24b (e.g. the arrangement of the light emitters 25) or by the outputs of the light emitters 25.

Particularly in this embodiment, the light exit-side layer 50, including the optical element portion 54 which can perform such a useful optical action, is formed by curing an ionizing radiation curable resin. Compared to injection molding or thermal transfer processing, the use of an ionizing radiation curable resin can produce the optical element portion 54 with significantly higher accuracy. For instance, the use of an ionizing radiation curable resin can produce with good accuracy the unit shaped elements 55 each having a sharp contour, in particular the apex 56 with corner R of not more than 2 μm, which cannot be produced with good accuracy by injection molding or thermal transfer processing. It therefore becomes possible to impart an excellent optical function to the optical element portion 54, thereby reducing the number of members for the surface light source device 20.

In this embodiment the unit shaped elements 55 each have a triangular shape in a cross-section perpendicular to the arrangement direction. It is essentially difficult for the conventional thermal transfer or injection molding method to produce with good accuracy the optical element portion 54 comprising an array of such unit shaped elements 55. In particular, it has been impossible to produce, by thermal transfer or injection molding, a light guide plate 30 which is adapted to a large-size display surface and whose unit shaped elements 55, having a triangular cross-sectional shape, have expected optical properties. Thus, when a light guide plate produced by thermal transfer or injection molding is used in a surface light source device, it is necessary to incorporate a separate optical sheet having a light condensing effect into the surface light source device. According to this embodiment, on the other hand, the unit shaped elements 55 of the optical element portion 54, formed by curing of an ionizing radiation curable resin, can be shaped such that the corner R of the apex 56 is not more than 2 μm as described above. Such unit shaped elements 55 can perform an expected optical action, such as refraction or retroreflection, with high efficiency. Therefore, compared to conventional light guide plates, the light guide plate of this embodiment enables reduction of the number of optical members for the surface light source device 20, thereby making it possible to reduce the production cost of the surface light source device 20, facilitate the assembly of the surface light source device 20 and make the surface light source device 20 thinner.

In the case of forming the unit shaped elements 55 of the optical element portion 54 by curing an ionizing radiation curable resin, it is possible to produce the unit shaped elements 55 having a similar cross-section and a smaller size as compared to those produced by thermal transfer or injection molding. The use of similar-shaped smaller unit shaped elements 55 makes it possible to lower the height H of the unit shaped elements 55 and reduce the average thickness t2 of the light exit-side layer 50 while maintaining the optical function. This can not only reduce the thickness of the light guide plate 30 and thus the thickness of the surface light source device 20, but can also reduce the below-described problems that may occur when light travels over a long distance in the light exit-side layer 50 composed of a cured product of ionizing radiation curable resin.

In this embodiment the light exit-side layer 50 of the light guide plate 30 is composed of a single resin material. Thus, while the body portion 40 contains the light scattering component 45, the light exit-side layer 50, lying adjacent to the body portion 40 and providing the light exit surface 30a of the light guide plate 30, does not contain the light scattering component 45. Because the light exit-side layer 50 does not contain a light scattering component, the light exit surface 30a can be formed as a smooth surface having no such irregularities (unevenness) as would exert a light scattering effect on visible light (e.g. irregularities having a size of more than 400 nm which is the shortest wavelength of visible light). Further, because the light exit-side layer 50 is formed by curing of an ionizing radiation curable resin, the light exit surface 30a has smoothness which cannot be obtained by thermal transfer or injection molding. The optical element portion 54 having the light exit surface 30a can therefore perform a designed function. In addition, the optical element portion 54 can prevent unintended exit (leak) of light from the light guide plate 30. Thus, light travels in the light guide plate 30 from the light entrance surface 30c toward the counter surface 30d while repeating planned reflections. This makes it possible to effectively equalize the amount of light, exiting the light exit surface 30a of the light guide plate 30, along the light guide direction.

In this embodiment the body portion 40 is comprised of a plate-like member formed by extrusion molding. Therefore, a flat light guide plate 30 having a high ratio (L/T) of the length L of the light guide plate 30 to the average thickness T of the light guide plate 30, i.e. a flat light guide plate 30 having a wide width and thin thickness, can be formed with good precision.

An optical member, produced by the use of an ionizing radiation curable resin, can cause discoloration of transmitted light due to the light absorbing effect of the resin. In a typical case, light that has passed through an optical member, which is formed from an ultraviolet curable resin, tends to take on a yellow tinge. In particular, light that has entered the light guide plate 30 travels from the light entrance surface 30c toward the counter surface 30d while repeating reflection at the light exit surface 30a and the back surface 30b. Accordingly, when the light exit-side layer 50 of the light guide plate 30 is formed from an ionizing radiation curable resin, light that has entered the light entrance surface 30c can travel in the resin layer over a long distance, whereby the possibility of the occurrence of discoloration become high.

In this regard, it has been found by the present inventors that the ratio (L/T) of the length L of the light guide plate 30 along a direction perpendicular to the light entrance surface 30c relative to the average thickness T of the light guide plate 30 along the normal direction nd of the plate plane of the light guide plate 30, is preferably not more than 500, and that the ratio (t2/t1) of the average thickness t2 of the light exit-side layer 50 along the normal direction nd of the plate plane of the light guide plate 30 relative to the average thickness t1 of the body portion 40 along the normal direction nd of the plate plane of the light guide plate 30, is preferably not more than 0.1. It has been confirmed experimentally by the present inventors that if these conditions are satisfied, no visible discoloration occurs in light exiting the light exit-side layer 50 composed of a cured product of an ultraviolet curable resin.

As the ratio (L/T) of the length L of the light guide plate 30 relative to the average thickness T of the light guide plate 30 increases, the number of reciprocations of light between the light exit surface 30a and the back surface 30b of the light guide plate 30 increases while the light travels a certain length in the light guide plate 30 from the light entrance surface 30c toward the counter surface 30d. Thus, with increase in the ratio L/T, light reflects a larger number of times at the light exit surface 30a and the back surface 30b of the light guide plate 30, and enters the light exit-side layer 50 a larger number of times. On the other hand, as the ratio (t2/t1) of the average thickness t2 of the light exit-side layer 50 relative to the average thickness t1 of the body portion 40 increases, light travels a longer distance in the light exit-side layer 50 while the light travels in the light guide plate 30 between the light exit surface 30a and the back surface 30b. The present inventors' research on the relationship between these parameters (the ratio L/T and the ratio t2/t1) and yellowing of light by an ultraviolet curable resin has revealed that yellowing of light can be prevented by setting the parameters in the above ranges.

The ratio (L/T) of the length L of the light guide plate 30 relative to the average thickness T of the light guide plate 30 is preferably low from the viewpoint of preventing discoloration of light transmitted through the light exit-side layer 50. A low L/T ratio, however, leads to a larger thickness of the surface light source device 20 including the light guide plate 30. From this viewpoint, the ratio (L/T) of the length L of the light guide plate 30 relative to the average thickness T of the light guide plate 30 is preferably not less than 100.

The ratio (t2/t1) of the average thickness t2 of the light exit-side layer 50 relative to the average thickness t1 of the body portion 40 is preferably low from the viewpoint of preventing discoloration of light transmitted through the light exit-side layer 50. A low t2/t1 ratio, however, makes it difficult to produce the optical element portion 54 with high accuracy. Furthermore, when the support portion 59 is too thin, a pattern of stripes, corresponding to the unit shaped elements 55 arranged in parallel, may be visible. From these viewpoints, the ratio (t2/t1) of the average thickness t2 of the light exit-side layer 50 relative to the average thickness t1 of the body portion 40 is preferably not less than 0.01.

As described hereinabove, according to this embodiment, excellent optical properties can be imparted to the light guide plate 30. This enables reduction of the number of optical members for the surface light source device 20, thereby making it possible to reduce the production cost of the surface light source device 20, facilitate the assembly of the surface light source device 20 and make the surface light source device 20 thinner.

Further, as described above, the directionality of light, traveling in the light guide plate 30, in the light guide direction can be enhanced. Thus, light emitted by each of the large number of light emitters (e.g. LEDs) 25 of the light sources 24a, 24b is prevented from spreading out in a direction perpendicular to the light guide direction, and therefore exits the light exit surface 30a of the light guide plate 30 mainly from a certain area which extends in the light guide direction. Therefore, the controller 18 may adjust the output of each of the light emitters 25 of the light sources 24a, 24b according to an image to be displayed on the display surface of the display device 10.

For example, when no image is to be displayed, in other words, a black is to be displayed in a particular area of the display surface 11 of the display device 10, it is possible to turn off a point-like light emitter 25 which supplies light to that area of the light exit surface 30a of the light guide plate 30 which corresponds to the particular area of the display surface 10. This can solve the conventional problem of poor contrast due to incomplete blocking by the display panel 15 of illuminating light from the surface light source device 20. Further, this can reduce the amount of power, and thus is preferred also from the viewpoint of energy saving.

In addition to the case of displaying a black, it is possible to adjust the output of each point-like light emitter 25 according to an image to be displayed on the display surface 11, thereby adjusting brightness in various areas of a displayed image without solely relying on the display panel 15. This also can enhance the contrast in a displayed image and achieve energy saving.

Various changes and modifications may be made to the above-described embodiment. Some variations will now be described with reference to the drawings. In the drawings referred to in the following description, the same reference numerals will be used for the same members or components as used in the above-described embodiment, and a duplicate description thereof will be omitted.

Figure 6:
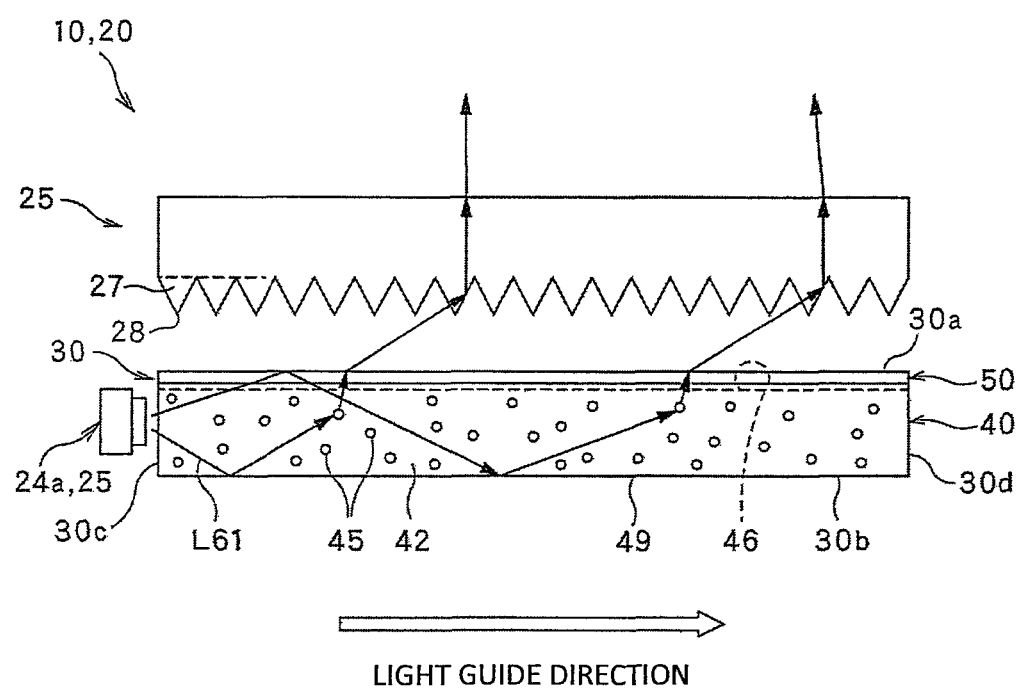
FIG. 6 is a diagram corresponding to FIG. 3, illustrating a variation of the light guide plate.

Though in the above-described embodiment the two side surfaces of the light guide plate 30, which oppose each other in the light guide direction, serve as the light entrance surfaces 30c, 30d, it is also possible to design the surface light source device such that only one of the side surfaces of the light guide plate 30 serves as a light entrance surface 30c as shown in FIG. 6. In the embodiment shown in FIG. 6, a light source 24a is disposed in a position facing the light entrance surface 30c, whereas no light source is disposed in a position facing the counter surface 30d that opposes the light entrance surface 30c in the light guide direction. The construction of the variation shown in FIG. 6, other than the light source and the light entrance surface, may be the same as the above-described embodiment.

Figure 7:
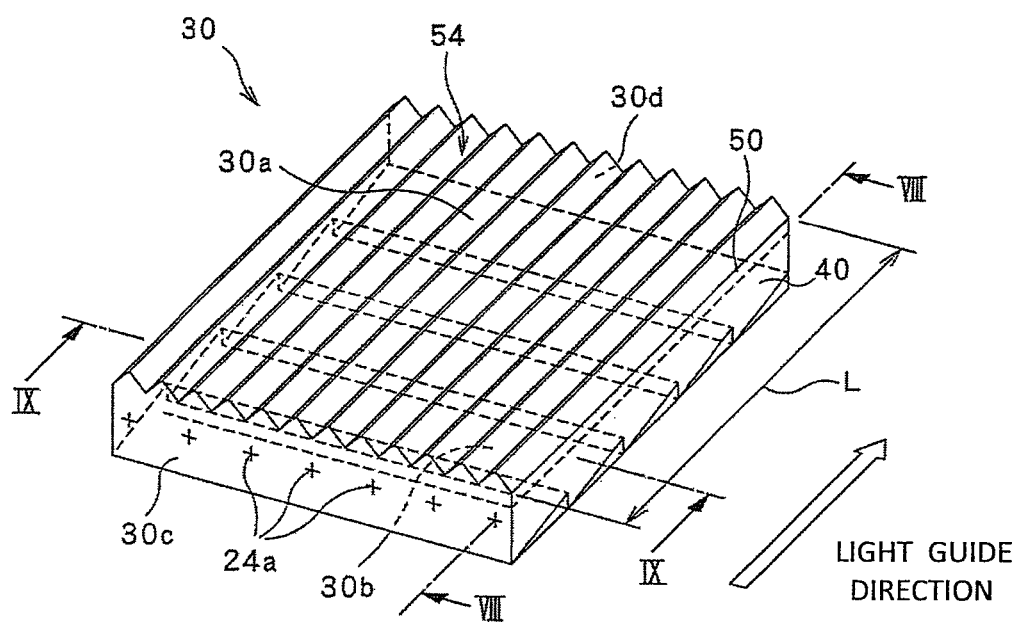
FIG. 7 is a diagram corresponding to FIG. 2, illustrating another variation of the light guide plate.
Figure 8:
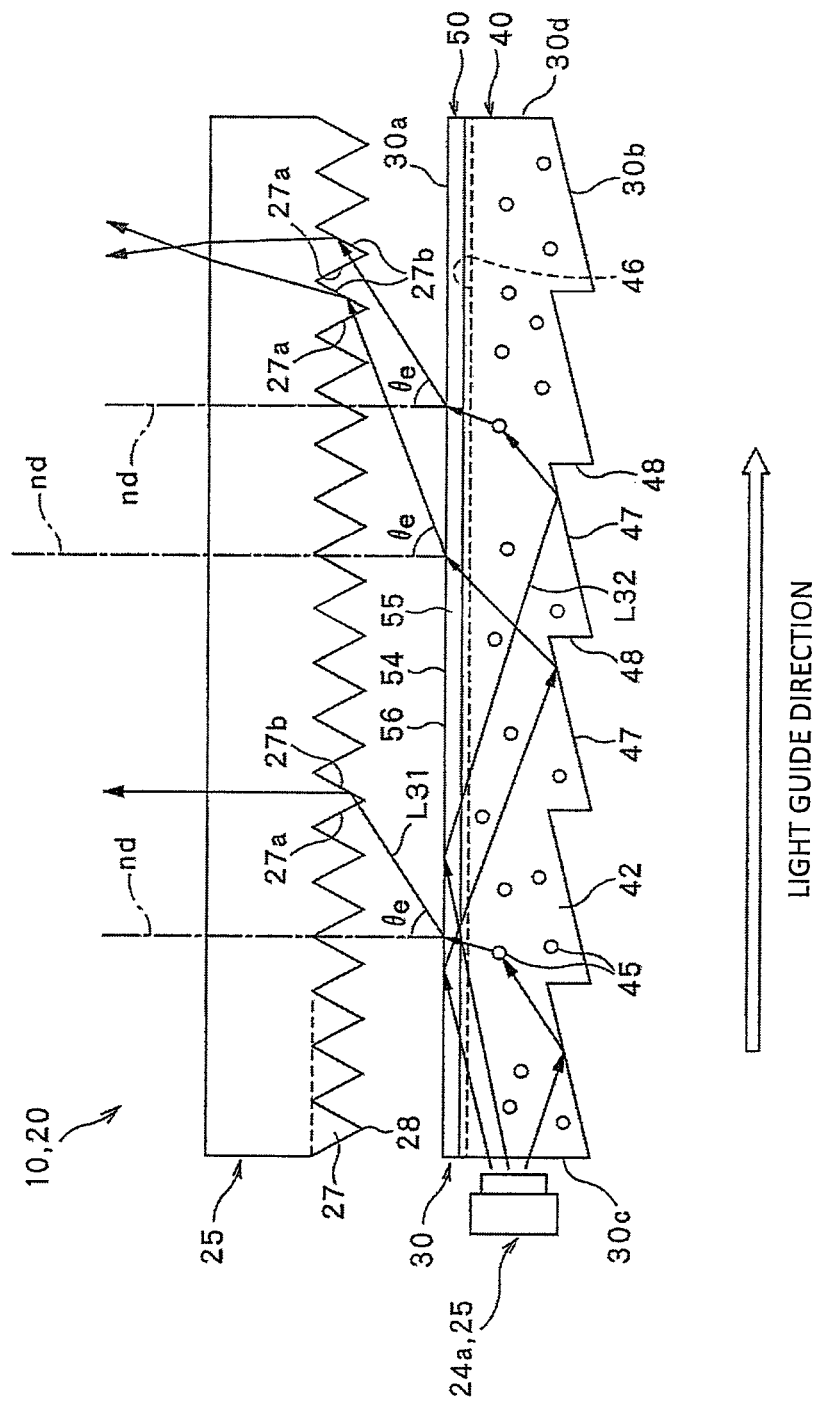
FIG. 8 is a diagram showing the light guide plate in the cross-section taken along the line VIII-VIII of FIG. 7 together with a light source and an optical sheet.
Figure 9:
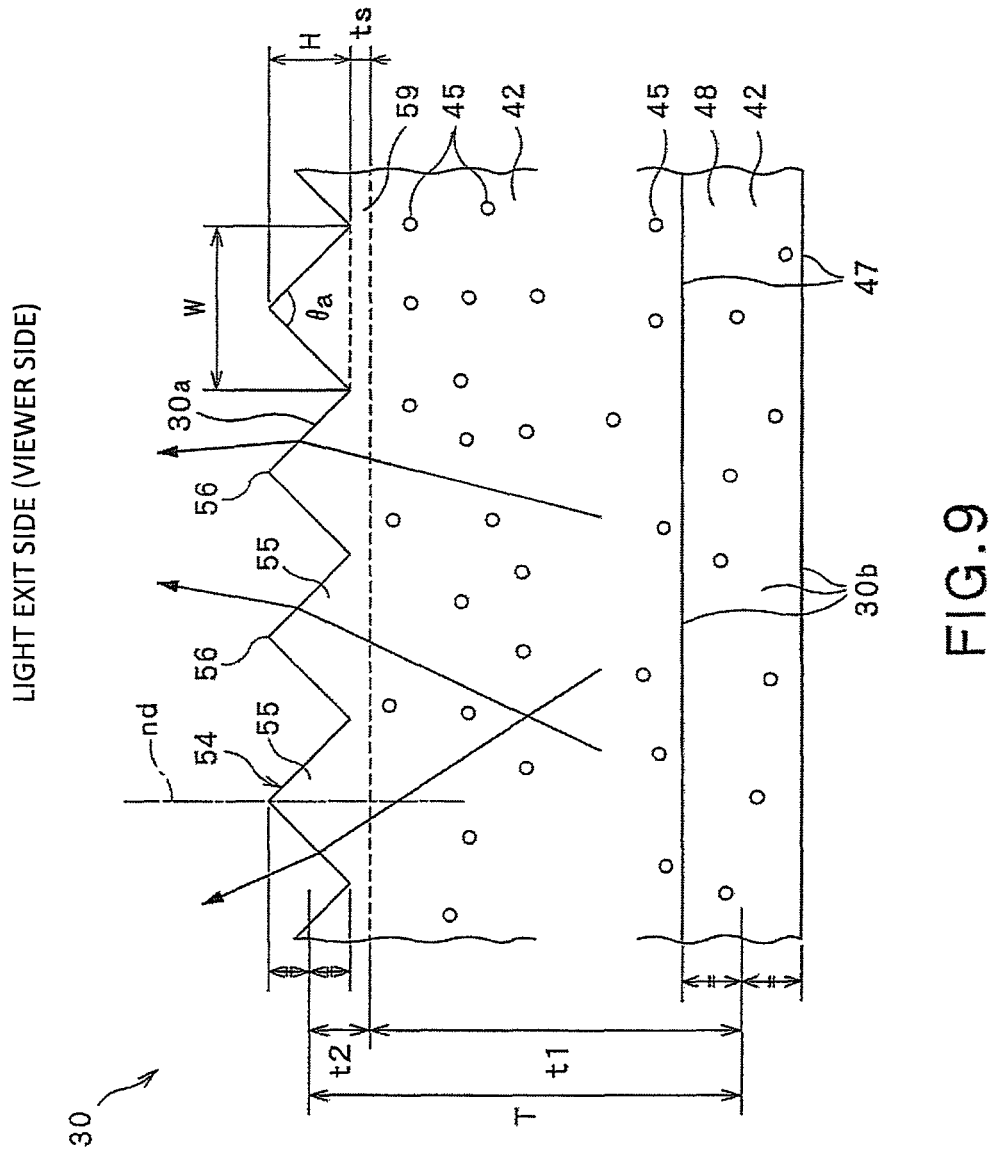
FIG. 9 is a cross-sectional view taken along the line IX-IX of FIG. 7.

Though in the above-described embodiment the light scattering component 45 is dispersed in the body portion 40 so that light that has entered the light guide plate 30 can exit the light guide plate 30, some other method may be used to cause light to exit the light guide plate 30. For example, as shown in FIGS. 7 through 9, it is possible to use inclined surfaces in the back surface 30b of the light guide plate 30 in addition to the use of the light scattering component 45. In the variation shown in FIGS. 7 through 9, only one of the side surfaces of the light guide plate 30 serves as a light entrance surface 30c, similarly to the variation shown in FIG. 6. The construction of the variation shown in FIGS. 7 through 9, other than the light source, the light entrance surface of the light guide plate and the back surface of the light guide plate, may be the same as the above-described embodiment. The variation shown in FIGS. 7 through 9 will therefore be described mainly with reference to the construction of the back surface of the light guide plate and advantageous effects associated with the construction.

In the variation shown in FIGS. 7 through 9, the body portion 40, on the side of the light exit surface 30a, has a flat surface 46 parallel to the plate plane of the light guide plate 30 and, on the side forming the back surface 30b, has a plurality of inclined surfaces 47, and step surfaces 48 each connecting two adjacent inclined surfaces 47. Each inclined surface 47 is inclined such that the distance to the light exit surface 30a decreases with distance from the light entrance surface 30c. Each step surface 48 extends in the normal direction nd of the plate plane of the light guide plate 30. Therefore, most of light, traveling in the light guide plate 30 from the light entrance surface 30c toward the counter surface 30d, reflects at an inclined surface(s) 47 without entering a step surface 48. As shown in FIG. 8, when light travels in the light guide plate 30 while repeating reflection at the light exit surface 30a and at the back surface 30b, the incident angle of the light at the light exit surface 30a or the back surface 30b decreases gradually and eventually becomes less than the critical angle for total reflection. Accordingly, light traveling in the light guide plate 30, even when it does not collide with the light scattering component 45, will exit the light guide plate 30 at a position remote from the light entrance surface 30c. This ensures a sufficient amount of light, exiting the light exit surface 30a of the light guide plate 30, in an area remote from the light entrance surface 30c where the amount of exiting light is likely to be small. The amount of light exiting the light guide plate 30 can thus be made uniform along the light guide direction.

In the variation shown in FIGS. 7 through 9, the step surfaces 48 and the inclined surfaces 47 extend parallel to the longitudinal direction of the light entrance surface 30c of the light guide plate 30 and to the longitudinal direction of the counter surface 30d. Accordingly, the body portion 40 has the same cross-sectional shape in any cross-section parallel to both a direction connecting the light entrance surface 30c and the counter surface 30d (light guide direction) and the normal direction nd of the plate plane of the light guide plate 30, i.e. in any cross-section as shown in FIG. 8.

Figure 10:
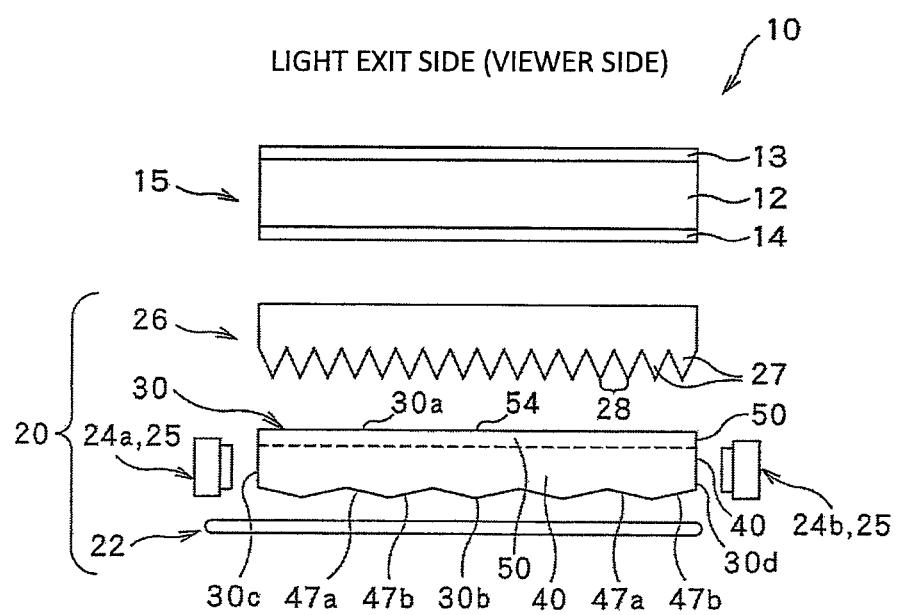
FIG. 10 is a diagram corresponding to FIG. 1, illustrating yet another variation of the light guide plate.

Though in the variation shown in FIGS. 7 through 9, the back surface 30b of the light guide plate 30 consists of the inclined surfaces 47 and the step surfaces 48, it is possible to eliminate the step surfaces 48, and to construct the back surface 30b of the light guide plate 30 as a continuous flat inclined surface or as a continuous curved surface. In the variation shown in FIGS. 7 through 9, a second light source 24b may be disposed opposite the counter surface 30d of the light guide plate 30, and the counter surface 30d may serve as a second light entrance surface. In that case, as shown in FIG. 10, the back surface 30b of the light guide plate 30 may consist of a plurality of inclined surfaces 47a, 47b arranged alternately and inclined symmetrically with respect to the normal direction nd.

Instead of or in addition to the above-described method(s) to cause light to exit the light guide plate 30, i.e. the method of dispersing the light scattering component 45 in the body portion 40 as in the above-described embodiment and/or the method of inclining the light exit surface 30a and the back surface 30b with respect to each other, it is possible to use some other method to take light out of the light guide plate 30. Examples may include a method of changing the height of the optical element portion 54 in the surface of the light exit-side layer 50 such that cross-sectional shapes of the unit shaped elements have a similarity shape along the longitudinal direction thereof, a method of roughening at least one of the light exit surface 30a and the back surface 30b, a method of providing a pattern of white scattering layer on the back surface 30b, etc.

In the above-described embodiment the light sources 24a, 24b are comprised of the plurality of point-like light emitters (LEDs) arranged side by side along the light entrance surfaces 30c, 30d of the light guide plate 30. However, various other types of light emitters usable in an edge-light type surface light source device, for example, cold-cathode fluorescent lamp extending parallel to the light entrance surfaces 30c, 30d of the light guide plate 30, may be used for the light sources 24a, 24b.

Though in the above-described embodiment each unit shaped element 55 has a triangular shape in a cross-section along the arrangement direction of the unit shaped elements 55, the cross-sectional shape of each unit shaped element 55 may be a shape other than a triangular shape, for example, a quadrangular shape such as a trapezoidal shape, or another polygonal shape such as a pentagonal or hexagonal shape. Further, the cross-sectional shape of each unit shaped element 55 may be a shape corresponding to part of a circle or an ellipse.

In the above-described embodiment the unit shaped elements 55 (light exit-side layer 50) are formed of a single resin material. However, as with the body portion 40, the unit shaped elements 55 may be formed of a resin containing a light scattering component.

Though in the above-described embodiment the cross-sectional shape of each unit shaped element 55 in a cross-section perpendicular to the light guide direction is constant along the light guide direction, this is not limitative of the present invention. It has been found through the present inventors' studies that the construction of the light exit surface 30a of the light guide plate 30, defined by the light exit-side layer 50, can exert a considerable influence on takeout of light from the light exit surface 30a. Specifically, the amount of light taken out of the light exit surface 30a of the light guide plate 30 can be controlled by adjusting the proportion relative to the total area of the light exit surface 30a, the inclination angle, etc. of an inclined surface(s) constituting the light exit surface 30a. It is therefore possible to change the cross-sectional shape of the unit shaped elements 55, defining the light exit surface 30a of the light guide plate 30, along the light guide direction in order to adjust the distribution of the amount of light, exiting the light exit surface 30a, along the light guide direction. Though in the above-described embodiment the unit shaped elements 55 are arranged side by side without any space between two adjacent unit shaped elements 55, it is possible to provide a flat surface between two adjacent unit shaped elements 55.

The above-described optical sheet 26, disposed on the light exit side of the light guide plate 30, is merely an example. It is possible to use various other types of optical sheets instead of the above-described optical sheet 26. For example, it is possible to use an optical sheet having unit prisms 27 on the light exit side. It is also possible to use an optical sheet having unit prisms 27, each having a cross-sectional shape other than a triangle, for example, a polygon other than a triangle, a part of an ellipse, etc.

The above-described constructions of the surface light source device 20 and the display device 10 are merely examples and are capable of various modifications. For example, a light diffusion sheet which functions to diffuse transmitted light, a polarization separation film which functions to transmit only a particular polarization component and reflect the other polarization component, etc. may be provided on the light exit side of the optical sheet 26.

The modifications described hereinabove may also be made in an appropriate combination to the above-described embodiments.

EXAMPLES

The following examples illustrate the present invention in greater detail and are not intended to limit the invention in any manner.

<Surface Light Source Device>

A number of surface light source devices were prepared. The devices each include a light guide plate, a light source, a reflective sheet and an optical sheet which are arranged in the same positional relationship as in the above-described embodiment. The surface light source devices are the same in the light source, the reflective sheet and the optical sheet, but differ from one another in the light guide plate as described below.

(Light Guide Plate)

The light guide plate consists of a body portion, and a light exit-side layer formed on the body portion.

The light exit-side layer has the same construction as the light exit-side layer 50 of the embodiment described above with reference to FIGS. 1 through 4. Thus, the light exit-side layer includes an optical element portion consisting of unit shaped elements, each having an isosceles triangular cross-sectional shape, arrange side by side with no space therebetween. The light exit-side layer was produced by curing an ultraviolet curable acrylic resin.

The body portion has the same construction as the body portion 40 of the embodiment described above with reference to FIGS. 1 through 4. Thus, the body portion is a rectangular plate-like member comprising a flat plate-like matrix with a constant thickness, having a pair of main parallel surfaces, and a light scattering component dispersed in the matrix. The matrix is formed of polymethyl methacrylate (PMMA).

As in the embodiment described above with reference to FIGS. 1 through 4, a pair of opposing side surfaces of the light guide plate serves as light entrance surfaces. Thus, the below-described light source was disposed so as to face each of the pair of side surfaces.

A number of light guide plates, having the above construction and having different dimensions as shown in Table 1 below, were prepared. The light guide plates have varying dimensions in the height H (see FIG. 4) of the unit shaped elements of the optical element portion, the width W (see FIG. 4) of each unit shaped element, the thickness ts (see FIG. 4) of the support portion of the light exit-side layer, the average thickness t2 (see FIG. 4) of the light exit-side layer, and the average thickness t1 (see FIG. 4) of the body portion. On the other hand, the light guide plates have otherwise the same dimensions. For example, the light guide plates all have the length L (see FIG. 2) of 500 mm. The length of each light entrance surface along the longitudinal direction is 240 mm in all the light guide plates.

(Light Source)

A light source was constructed by arranging a large number of white LED chips. Each LED chip has a size of 1.6 mm×0.8 mm, and the large number of white LED chips was arranged at a pitch of 2.0 mm in the longitudinal direction of each light entrance surface of the light guide plate such that the 0.8-mm side of each LED chip is parallel to the thickness direction of the light guide plate. The light source was disposed so as to face each of the two opposing light entrance surfaces of the light guide plate. The two light sources were disposed such that a 0.8-mm gap was formed between each light source and the corresponding light entrance surface of the light guide plate.

(Reflective Sheet)

A white 250-μm thick polyester film as a reflective sheet was disposed so as to face the back surface of the light guide plate.

(Optical Sheet)

A so-called prism sheet as an optical sheet was disposed so as to face the light exit surface of the light guide plate. The optical sheet (prism sheet) consists of a 125-μm thick polyester film, and unit prisms formed from an ultraviolet curable acrylic resin. Each unit prism has an isosceles triangle shape with an apex angle of 65° at the top in a cross-section perpendicular to the longitudinal direction. As with the optical sheet of the above-described embodiment, the optical sheet was disposed such that the unit prisms project toward the light guide plate and that the arrangement direction of the unit prisms is parallel to the light guide direction of the light guide plate.

<Evaluation Method>

Each surface light source device with the light sources lighting was observed visually at a distance of 1 m from the light emitting surface of the surface light source device along the normal direction of the light guide plate to check whether visible discoloration was observed. In Table 1, the symbol "X" in the row headed "visual determination" indicates that a visible color change was observed, and "O" indicates that no visible color change was observed. Furthermore, the chromaticity of the light emitting surface of each surface light source device was measured from the same position as in the above visual observation, using a color/luminance meter BM-5A (manufactured by Topcon Corporation). Table 1 shows the results of the chromaticity measurement performed at a position corresponding to the center of the light exit surface of the light guide plate.

As shown in Table 1, no visible color change was observed and thus good results were obtained in the surface light source devices of Examples 1 to 3, including the light guide plates which each satisfy the following conditions:

the ratio (L/T) of the length L of the light guide plate in the light guide direction relative to the average thickness T of the light guide plate is not more than 500; and the ratio (t2/t1) of the average thickness t2 of the light exit-side layer relative to the average thickness t1 of the body portion is not more than 0.1.

On the other hand, yellowing was clearly observed visually in the surface light source device of Comp. Example 1, including the light guide plate in which the ratio (t2/t1) of the average thickness t2 of the light exit-side layer to the average thickness t1 of the body portion exceeds 0.1, and in the surface light source device of Comp. Example 2, including the light guide plate in which the ratio (L/T) of the length L of the light guide plate in the light guide direction to the average thickness T of the light guide plate exceeds 500.

TABLE 1

The shape of the light guide plate of each sample and the evaluation results for each sample

| | | Samples | | | | |
|---|---|---|---|---|---|---|
| | | Example 1 | Example 2 | Example 3 | Comp. Example 1 | Comp. Example 2 |
| Shape of light guide plate | Height H of each unit shaped element (μm) | 25 | 50 | 50 | 120 | 50 |
| | Width W of each unit shaped element (μm) | 50 | 100 | 100 | 240 | 100 |
| | Thickness ts of support portion (μm) | 10 | 10 | 10 | 50 | 10 |
| | Average thickness t2 of light exit-side layer (μm) | 22.5 | 35 | 35 | 110 | 35 |
| | Average thickness t1 of body portion (μm) | 1000 | 1000 | 2000 | 1000 | 900 |
| | Average thickness T of light guide plate (μm) | 1022.5 | 1035 | 2035 | 1110 | 935 |
| | Length L of light guide plate (μm) | 500 | 500 | 500 | 500 | 500 |
| | Ratio (L/T) | 489 | 483 | 246 | 450 | 535 |
| | Ratio (t2/t1) | 0.023 | 0.035 | 0.018 | 0.110 | 0.039 |
| Evaluation | Visual determination | ○ | ○ | ○ | X | X |
| | Chromaticity X | 0.3053 | 0.3175 | 0.3076 | 0.3285 | 0.3254 |
| | Y | 0.2975 | 0.3154 | 0.2999 | 0.3284 | 0.3248 |

The invention claimed is:

1. A light guide plate comprising:
a light exit surface;
a back surface opposed to the light exit surface;
a light entrance surface consisting of at least part of a side surface between the light exit surface and the back surface;
said light guide plate further comprising:
a body portion; and
a light exit-side layer disposed on a side of the light exit surface side relative to the body portion and formed by curing of an ionizing radiation curable resin;
wherein the light exit-side layer includes an optical element portion which defines the light exit surface and which has a plurality of unit shaped elements arranged in one direction, the one direction intersecting a direction connecting the light entrance surface and a surface which consists of another part of the side surface and which is opposed to the light entrance surface, each unit shaped element extending linearly in a direction intersecting the one direction;
wherein a ratio (L/T) of a length L of the light guide plate, from the light entrance surface to the surface consisting of another part of the side surface and opposed to the light entrance surface, relative to an average thickness T of the light guide plate along a normal direction of a plate plane of the light guide plate, is not more than 500; and
wherein a ratio (t2/t1) of an average thickness t2 of the light exit-side layer along the normal direction of the plate plane of the light guide plate to an average thickness t1 of the body portion along the normal direction of the plate plane of the light guide plate, is not more than 0.1.

2. The light guide plate according to claim 1, wherein the unit shaped elements each have a triangular shape in a cross-section along the arrangement direction thereof.

3. The light guide plate according to claim 1, wherein the light exit-side layer is composed of a single resin material.

4. The light guide plate according to claim 1, wherein the body portion is composed of a resin and a light scattering component dispersed in the resin.

5. The light guide plate according to claim 1, wherein the body portion is a plate-like member formed by extrusion molding.

6. A surface light source device comprising:
the light guide plate according to claim 1; and
a light source disposed so as to face the light entrance surface of the light guide plate.

7. The surface light source device according to claim 6, further comprising:
a reflective sheet disposed so as to face the back surface of the light guide plate; and
an optical sheet disposed so as to face the light exit surface of the light guide plate, the optical sheet having unit prisms.

8. A display device comprising:
the surface light source device according to claim 6; and
a liquid crystal panel disposed so as to face the surface light source device.

9. The display device according to claim 8, further comprising a controller configured to control an output of the light source,
wherein the light source includes point-like light emitters arranged so as to face the light entrance surface of the light guide plate; and
wherein the controller adjusts the output of each point-like light emitter according to an image to be displayed.

* * * * *